July 26, 1955
J. E. EVERETT
2,713,956
HERMETICALLY SEALED COFFEE CAN
Filed Aug. 26, 1953
2 Sheets-Sheet 1
FIG. 1
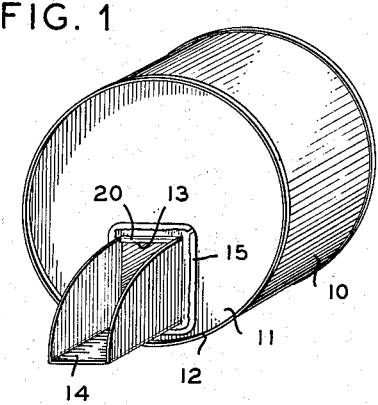
FIG. 2
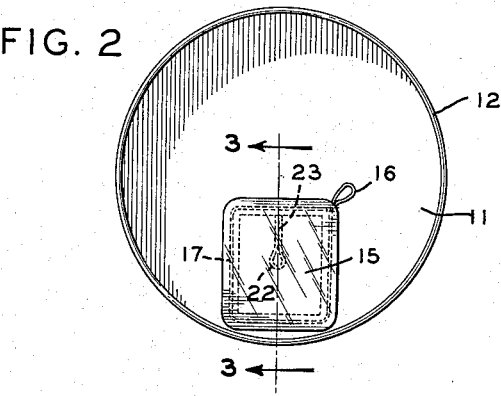
FIG. 3
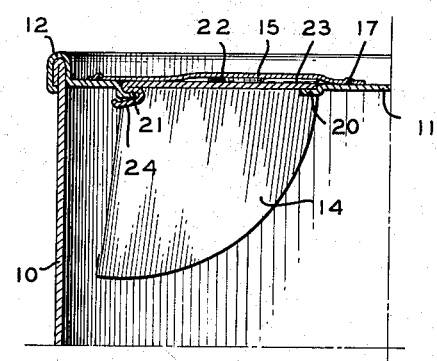
FIG. 4
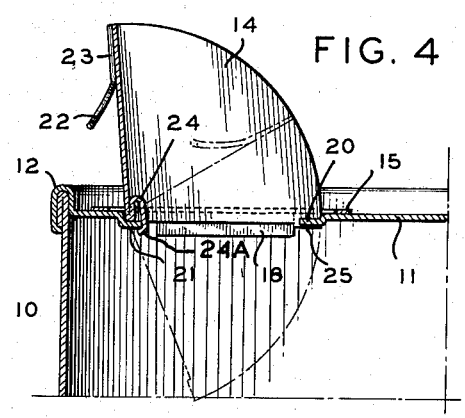
FIG. 6
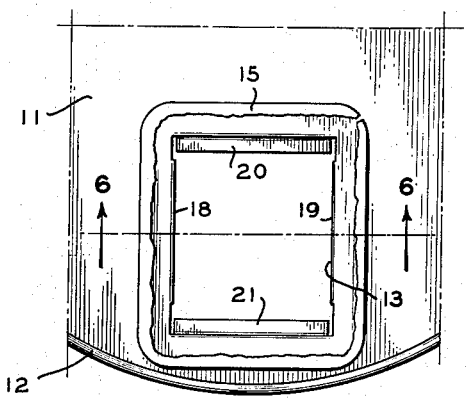
FIG. 5
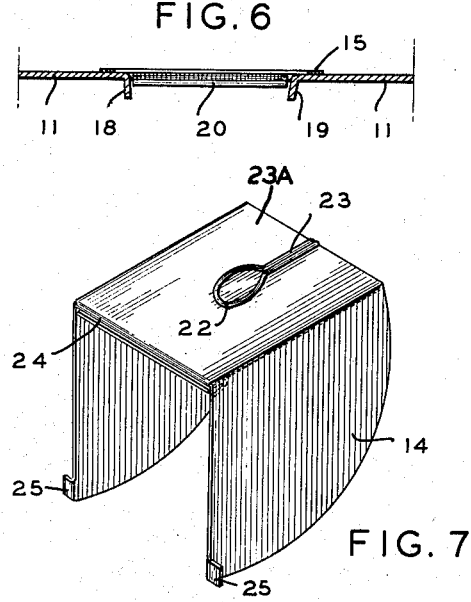
FIG. 7
INVENTOR
JOHN E. EVERETT
BY A. Yates Dowell
ATTORNEY

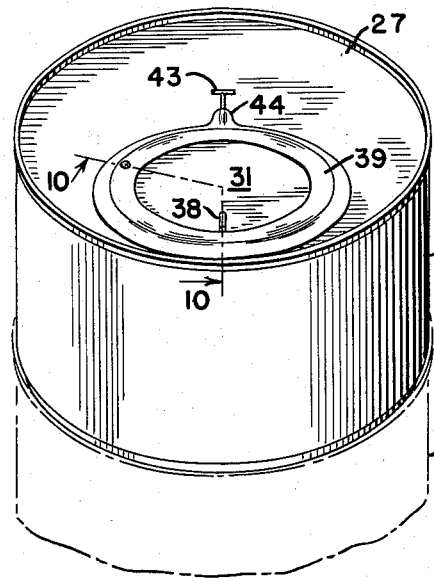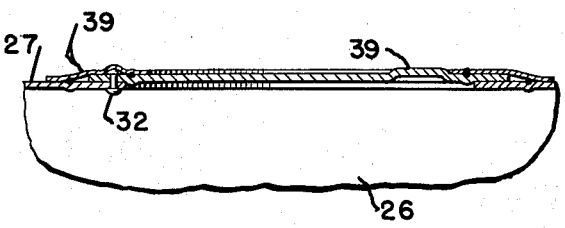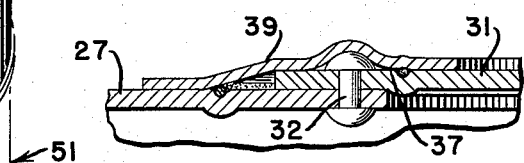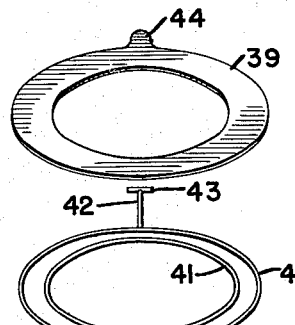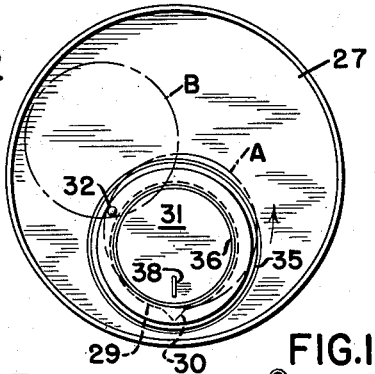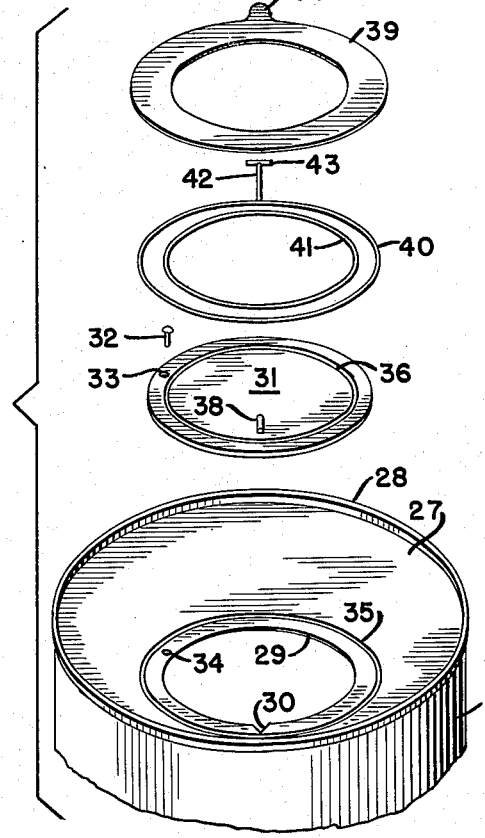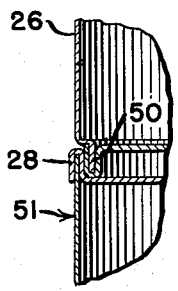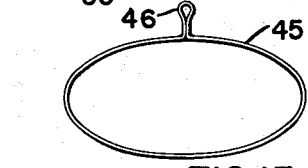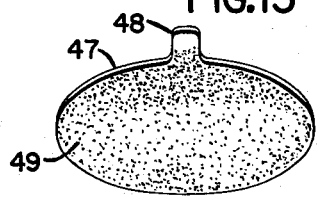

United States Patent Office 2,713,956
Patented July 26, 1955

2,713,956

HERMETICALLY SEALED COFFEE CAN

John E. Everett, Wilmette, Ill.

Application August 26, 1953, Serial No. 376,668

6 Claims. (Cl. 222—532)

This invention relates to the packaging of products of various kinds in order to protect the same and maintain them in the desired condition. The invention is particularly concerned with a type of package and specifically with a container which can be used not only in the packaging and storage of coffee or other substances but which likewise can be of assistance in the dispensing of the coffee or the like in actual use.

Heretofore coffee and other products have been packaged in containers of various kinds including paper, cardboard, tin or other materials some of which were intended to keep the coffee free of germs and foreign matter and some to keep it hermetically sealed to retain the desired flavor and aroma as well as to avoid rancidity.

Packages of various types including those hermetically sealed have presented problems of various kinds including expense, difficulty in opening and difficulty in using without substantial waste and the inability to maintain the container in anything approaching an airtight condition. Also prior art containers have been cumbersome to handle since they could not be stacked in high piles nor could the containers be readily closed and reopened and closed at will.

It is an object of the invention to provide a practical container or can in which coffee or other products can be packed and retained in hermetically sealed condition but which can be easily opened without the use of any type of opener, is so constructed that it can be readily stacked and when opened it will have an opening large enough to permit free removal of its contents by a spoon or other implement or its contents can be readily poured from the container thereby promoting economy in use and which can be readily closed after a desired amount of the contents has been removed.

Another object of the invention is to provide a container for loose material in which the material may be maintained in a fresh condition before as well as after removal of a hermetic seal.

A further object is to provide a container for storage of loose material and which may be used for other purposes after its original contents have been dispensed.

Another object is to provide a container from which the product may be accurately poured without loss.

A further object is to provide a container which is hermetically sealed and which may be opened without the use of any implement.

A further object of the invention is to provide a container which provides facilities for accurately stacking the container in relatively high stacks without requiring auxiliary support.

Briefly stated, the invention relates to a container for use in packaging loose material in which a movable closure is provided on an end wall of the container and a seal is formed over the movable closure with a strand located between the seal and the end of the container so that by a tensile pull on the strand material the seal may be broken or removed and the closure moved to its dispensing position.

In one form of the invention the movable closure includes a pouring spout which may be moved from a closed position within the container with a part of the spout serving as a closure lid to an open position with the spout projecting outwardly from the container or can.

In another form of the invention the head or top end of the can is provided with a discharge opening adjacent the periphery thereof and such opening including a notch at the region closest to the periphery of the container. A closure or lid is pivoted on the outer surface of the top of the can to overlap the top adjacent the opening when in its closed position. The pivotal connection is spaced inwardly from the periphery of the can and laterally of the opening. A groove is provided in the end of the can outwardly of the closed position of the closure and a groove is provided in the closure inwardly of the opening. A relatively flat thin sealing ring of a size to overlap both grooves is provided with a strand such as wire coated with solder for reception within the groove in the top end wall while a ring of solder is provided on the sealing ring for reception into the groove in the closure. Upon application of heat to the sealing ring, when the wire and solder rings are in proper position in the grooves of the top wall and the closure, a hermetic seal is obtained. The wire may project beyond the periphery of the sealing ring to permit removal of the sealing ring by lifting on the wire thereby removing or breaking the sealing ring so the closure may be moved to its open position.

Further objects and advantages of the invention will be apparent from the following description taken in conjunction with the drawings wherein:

Fig. 1 is a perspective view of one form of the invention including a pouring spout in position for dispensing the contents;

Fig. 2, a top plan view of the container of Fig. 1;

Fig. 3, a fragmentary sectional view taken on line 3—3 of Fig. 2 showing the pouring spout in closed position with the seal in unbroken condition;

Fig. 4, a sectional view similar to Fig. 3 showing the seal broken and the pouring spout in position for dispensing the contents;

Fig. 5, a fragmentary plan view of the opening in the top end of the container showing the flanges which limit movement of the spout and prevent loss of contents;

Fig. 6, a fragmentary sectional view taken on line 6—6 of Fig. 5;

Fig. 7, a perspective view of the pouring spout and its lifting handle.

Fig. 8, a perspective view of a modified form of dispensing container showing the closure with the seal applied and illustrating how the containers may be stacked;

Fig. 9, an exploded view showing the various parts of the closure and a portion of the container of the modification of Fig. 8;

Fig. 10, a sectional view taken substantially on broken line 10—10 of Fig. 8;

Fig. 11, an enlarged fragmentary sectional view showing the pivot and a portion of the sealing construction;

Fig. 12, a plan view of the container of Fig. 8 showing the various positions of the closure in phantom lines;

Fig. 13, a fragmentary sectional view showing a portion of the top of one can and the bottom of the can supported thereon illustrating the manner in which the cans or containers may be stacked;

Fig. 14, a modification of the sealing wire which serves the function of an opener; and Fig. 15, a modification of a seal which may be used in place of the sealing ring, or may be used subsequent to removal of the sealing ring.

Referring more particularly to the drawings wherein like reference numerals indicate like parts throughout a form of container or coffee tin of the present invention (Figs. 1 to 7) comprises a side wall 10, a head or end wall 11 and a joint 12. The head or end wall 11 is provided with an opening 13 in which is mounted a pouring spout 14. For sealing the pouring spout a diaphragm of relatively thin frangible material, membrane or sheet 15 covers the opening 13 as well as the exposed portion of the pouring spout 14 and is made airtight by flowing solder or the like around its margin. A loop 16 is exposed from beneath the edge of the sheet 15 and is connected to a cord or wire 17 which extends completely around the sheet 15 and beneath the same and preferably engaging the top or end wall 11. Where the container is made of metal and the sealing diaphragm is also of metal, the wire 17 may be coated with solder and partially secured to a metal membrane 15 and such metal membrane may be secured to the head or end 11 by heating the wire 17 to cause the solder to secure the membrane 15 to the head or end wall 11. The loop 16 projecting from wire 17 serves as means for removing or breaking the seal 15 to permit the pouring spout closure 14 to be moved from its closed to its open position. Although the container is preferably made of metal, it will be evident that other materials may be used such as plastics, paper, or the like and the sealing membrane may be made of similar material including thermoplastic materials to provide the necessary protection for the contents.

In order to accommodate the pouring spout and provide a close fitting joint about the same, the head or end wall 11 adjacent the opening 13 is formed to snugly engage the pouring spout 14. The end wall 11 includes downwardly extending flanges 18 and 19 defining the lateral sides of the opening 13 while step down inner and outer flanges 20 and 21 provide a hinge adjacent the periphery of the can and a stop adjacent the center and narrow slots are formed at the ends of the step down flanges 20 and 21 to accommodate the side walls of the pouring spout 14.

In order to facilitate use of the pouring spout after the sealing diaphragm is removed a loop 22 which may be of wire fused or otherwise secured by attaching portion 23 to the central wall portion 23A of the pouring spout is provided and may be bent upwardly for engagement by the fingers.

The outer edge of the central wall portion 23A of the pouring spout is reversely folded to provide a socket 24 for receiving the flange 21 and the extreme end 24A of the socket 24 prevents unintentional removal of the pouring spout 14. The innermost portions of the sidewalls of the pouring spout are provided with lugs or projections 25 which limit the pivotal movement of the pouring spout as shown in Fig. 4. As described above it will be obvious that the container according to Figs. 1 to 7 may be used for various products such as coffee, sugar, salt, tea and the like and the material from which it is made will be selected in accordance with the needs. However, metal is suitable for the container as well as the seal and the sealing may be accomplished with solder.

Referring to the Figs. 8 to 15, inclusive, a modified form of the invention includes a container having a side wall 26 and a top end wall 27 connected by the usual connecting joint 28 providing an upstanding flange. The top end wall 27 is provided with an opening 29 which may be circular in outline and may include a notch 30 located at the point closest to the periphery of the can. A cover or closure lid 31 is pivotally connected to the end wall 27 by a rivet 32 extending through an aperture 33 in the cover and an aperture 34 in the top end wall and provided with heads at each end securing the cover 31 to the top end wall 27 as shown in Figs. 10 and 11. The top end wall 27 is provided with a groove 35 outwardly of the cover 31 and the cover 31 is provided with a groove 36 just inside of the outlines of the opening 29 so that the downwardly extending ridge 37 lies within the opening 29 for maintaining the lid in closed position. These grooves 35 and 36 may be made by embossing the metal in a well known manner and the inwardly projecting portion or ridge 37 resulting from the formation of the groove 36 serves as a detent for retaining the cover 31 in proper closed position and prevents unintentional displacement of such cover. A projection 38 may be provided on the cover by embossing or the like to serve as a handle for moving the cover from its closed position shown in full lines in Fig. 12 to the phantom line positions or any intermediate position desired. If opened to phantom line position A the contents may be poured only from notch 30 and if opened to phantom line position B substantially the entire opening 29 is free for the removal of the contents.

To hermetically seal the can, a sealing ring 39 preferably of light metal such as shim stock and of a size to overlap grooves 35 and 36 is provided. An outer ring 40 of wire coated with solder is secured to the sealing ring 39 and an inner ring 41 of solder is also secured to the same side of the ring 39 inwardly of wire ring 40 so that the sealing ring with the wire and solder rings 40 and 41 may be placed on the end wall 27 and closure lid 31 as shown in Figs. 8 and 10 and when the proper degree of heat is applied a hermetic seal is formed by the solder. It will be noted that the rivet 32 serving as the pivot is hermetically sealed by the same operation since the annular seal 39 is hermetically sealed on concentric circles inwardly and outwardly of the rivet.

The wire or strand material 40 is provided with a projecting portion 42 terminating in a T-shaped handle 43 to assist in applying a force on the wire 40 to break the seal between sealing ring 39 and the top of the can. If desired a tab 44 may be provided on the sealing ring to be used in addition to or in conjunction with the T-shaped handle 43 in removing the sealing ring.

In Fig. 14 a modification of the sealing ring is shown in which a wire or strand ring 45 is provided with a loop 46 in place of the T-shaped handle to assist in removing the sealing cover ring 39.

For some uses such as in packaging candy, the seal may be accomplished by a disc of sufficiently large diameter to cover the closure lid 31 and a portion of the end wall 27 and such a disc 47 (Fig. 15) having a tab 48 may be provided with an adhesive material 49 for holding the sealing disc in position. Such adhesive material may be of the kind which retains its adhesive property like "Scotch tape" so that the seal may be restored after a portion of the contents have been removed. A sealing disc 47 may be provided with a can sealed in the manner shown in Figs. 8 to 12 so that the contents may be protected from air after being opened and such sealing disc 47 may be applied over the sealing ring 39 if desired or may be furnished separately.

To provide for stacking of the cans, the bottom of the can may be made so that the projecting flange 50 (Fig. 13) is offset from the side 26 of the can providing a downwardly extending annular flange which telescopes within the upstanding flange 28 of the top end wall of the can immediately therebelow thereby providing secure stacking of a large number of containers as shown in Figs. 8 and 13 and the lower container 51 is shown fragmentarily in Figure 13 as well as being shown in phantom lines in Fig. 8.

If desired instead of the circular opening, an opening having flat sides may be provided and a pouring spout of a different character employed. Also instead of having a ring covered joint between the top and the cover a solid disc may be employed similar to that shown in Figure 15.

Although the container has been shown and described as being made of metal, it is contemplated that other materials may be used which provide the necessary fluid tightness for the product contained in the can.

It will be evident that a table spoon, or other implement may be inserted in the opening of the modification shown in Figures 8 to 15 and an edge of the opening may be made flat so that a measured tablespoon or teaspoon of the contents may be withdrawn.

Also, the pivoted closure lid may be opened varying amounts to permit pouring the contents in a controlled stream whether the contents be powdered or liquid.

The container described above may be used for receiving various types of articles such as screws, bolts, fish hooks and the like and the feature of providing stacking makes it possible to store a large number of cans in stacked relation without auxiliary support thereby avoiding unnecessary confusion in stores and the like. The dispensing feature of the container adds to the sales appeal of articles contained therein.

It will be obvious to those skilled in the art that various changes may be made in the invention without departing from the spirit and scope thereof and therefore the invention is not limited by that shown in the drawing or described in the specification but only as indicated in the appended claims.

What is claimed is:

1. A coffee can comprising a cylindrical container having an opening in one end located between the center and the circumference, that portion of the opening adjacent the circumference being of a configuration to facilitate pouring from the container and from its lower portion when on its side, a swingable closure for said opening pivoted substantially at right angles to a line drawn from the pouring portion of said opening through the diameter of the same, the end of the container being provided with a groove in its exterior surface around the margin of said opening, said closure having an annular ridge of a size and shape to fit within the opening in the container, and a sealing ring of a size and configuration to snugly overlie the joint between the closure and the wall of the container about said opening and a fusion ring on the underside of said sealing ring whereby upon the application of heat upon said sealing ring, said fusion ring will be caused to melt and seal the joint between the sealing ring and the closure, said fusion ring having a loop extending from beneath said sealing ring to permit engagement and rupture of the seal.

2. A dispensing container comprising a closed receptacle having an opening in an end wall adjacent the periphery thereof and having a restricted notch at the point of the opening closest the periphery thereof, a lid pivotally mounted on said end wall for movement about a pivotal axis normal to the said end wall and spaced in from the periphery of the receptacle an amount less than the radial dimension of the lid whereby the lid may be swung to open and closed positions within the outline of the end wall, said end wall having an annular groove formed in the outer surface thereof outside of the outline of the lid when the lid is in its closed position, the lid having an annular groove adjacent to and spaced inwardly of the periphery thereof so the pivot lies between the grooves, a strand having fusible material in the outer groove, a fusible material in the inner groove, a ring of thin material extending between said grooves and sealed to said strand and said fusible material thereby making a fluid tight seal, and a projection on said lid for manipulation of the cover from closed to open position.

3. A vacuum sealed container comprising a side wall and end walls, an opening in one of said end walls for the discharge of the contents of said container, a closure for said container of a size to overlap said one end wall and close said opening, an inwardly extending ridge on said closure for reception in said opening, to locate the closure in proper relation, means to mount said closure for movement from closed to open position, a sealing member extending between said one end wall and said closure and fusible means on said sealing member for fixing said sealing member and maintaining a vacuum in said container.

4. A dispensing container comprising a receptacle including a top wall with a rectangular discharge opening in said top wall, inwardly extending flanges on opposite sides of said opening, offset flanges at the opposite ends of said opening providing ledges beneath the upper surface of said wall, a channel shaped pouring spout having its main web of a size to substantially close said opening, an offset socket on the underside of said main web adjacent one end of said opening embracing one of said offset flanges, said socket having a projecting portion overlapping the adjacent offset flange, the side walls of said pouring spout being arcuate about said socket and said flange, a stop on said side walls to engage said top wall for limiting the movement of said pouring spout, said ledges on said flanges at the ends of the opening serving to support said pouring spout in closed position so that the upper surface of the main web thereof is substantially flush with the top of the receptacle, a handle mounted on said main web by which the spout may be moved from its closed to open position.

5. The structure of claim 4, a sealing member of larger dimension than said main web and overlying said web and said top wall in a closed position, and means providing a hermetic seal between said sealing member and said top wall.

6. The structure of claim 5, a strand located between the overlying portions of said sealing member and said top wall and having a projection extending beyond the periphery of said sealing member for the removal of said sealing member without requiring an auxiliary implement.

References Cited in the file of this patent

UNITED STATES PATENTS

| | | |
|---|---|---|
| 150,819 | Brown | May 12, 1874 |
| 1,252,543 | Gretton | Jan. 8, 1918 |
| 2,048,859 | Grove | July 28, 1936 |
| 2,093,807 | Emery et al. | Sept. 21, 1937 |
| 2,138,060 | Conner | Nov. 29, 1938 |
| 2,166,783 | Munk | July 18, 1939 |
| 2,239,691 | Becker | Apr. 29, 1941 |
| 2,545,178 | Vaughn | Mar. 13, 1951 |